(12) United States Patent
Teshima et al.

(10) Patent No.: US 8,189,056 B2
(45) Date of Patent: May 29, 2012

(54) IMAGE CAPTURING APPARATUS, ANGLE-OF-VIEW ADJUSTING METHOD AND RECORDING MEDIUM

(75) Inventors: Yoshihiro Teshima, Higashimurayama (JP); Kouichi Nakagomi, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 286 days.

(21) Appl. No.: 12/709,639

(22) Filed: Feb. 22, 2010

(65) Prior Publication Data

US 2010/0214444 A1 Aug. 26, 2010

(30) Foreign Application Priority Data

Feb. 23, 2009 (JP) ................. 2009-039270

(51) Int. Cl.
*H04N 5/228* (2006.01)
*H04N 5/262* (2006.01)
*H04N 5/232* (2006.01)
*H04N 5/225* (2006.01)
*G06K 9/00* (2006.01)
*G06K 9/62* (2006.01)
*G06K 9/64* (2006.01)

(52) U.S. Cl. .............. 348/208.14; 348/240.99; 348/352; 348/169; 348/170; 348/345; 382/103; 382/209; 382/217; 382/228

(58) Field of Classification Search ............. 348/231.99, 348/231.1, 231.2, 231.3, 208.14, 240.2, 240.99, 348/240.1, 211.9, 345, 169, 170, 171–172, 348/352; 382/254, 255, 305, 103, 209, 215, 382/217, 228

See application file for complete search history.

(56) References Cited

U.S. PATENT DOCUMENTS

| 6,507,366 | B1 * | 1/2003 | Lee ............................... 348/352 |
| 8,013,913 | B2 * | 9/2011 | Nakagomi et al. ........ 348/231.99 |
| 2009/0028386 | A1 | 1/2009 | Michimoto et al. |
| 2010/0150401 | A1 * | 6/2010 | Kizuki et al. ................. 382/103 |

FOREIGN PATENT DOCUMENTS

| JP | 06-006666 A | 1/1994 |
| JP | 06006666 A * | 1/1994 |

(Continued)

OTHER PUBLICATIONS

Japanese Office Action dated Jan. 7, 2011 (and English translation thereof) in counterpart Japanese Application No. 2009-039270.

*Primary Examiner* — Lin Ye
*Assistant Examiner* — Marly Camargo
(74) *Attorney, Agent, or Firm* — Holtz, Holtz, Goodman & Chick, PC

(57) ABSTRACT

In a digital camera 1, a storing means stores feature quantities of a subject area in an image, and a search point setting means sets a plurality of search points in the subject area. Next, an updating means updates coordinates of the set plurality of search points using random numbers. Then, a weight setting means compares feature quantities of the updated search points with the stored feature quantities, and sets a weight for each search point based on similarity. Next, a sorting means sorts the search points depend on those weight, and a variance acquiring means calculates the variance of the sorted search points. Then, an angle-of-view adjusting means determines the amount of adjustment for the angle-of-view based on the calculated variance.

8 Claims, 12 Drawing Sheets

FOREIGN PATENT DOCUMENTS

| | | | |
|---|---|---|---|
| JP | 11-308517 | A | 11/1999 |
| JP | 2002-374521 | A | 12/2002 |
| JP | 2002374521 | A * | 12/2002 |
| JP | 2007-208453 | A | 8/2007 |
| JP | 2008-262331 | A | 10/2008 |
| JP | 2009-038777 | A | 2/2009 |
| JP | 2009038777 | A * | 2/2009 |

* cited by examiner

FIG. 9

| PARTICLE P NUMBER | WEIGHT Pw | INTEGERS ASSOCIATED WITH PARTICLE P |
|---|---|---|
| 23 | 22 | 0—21 |
| 248 | 22 | 22—43 |
| 109 | 21 | 44—64 |
| 95 | 18 | 65—82 |
| 83 | 18 | 83—100 |
| ⋮ | ⋮ | ⋮ |
| 14 | 5 | 1014—1018 |
| 156 | 5 | 1019—1023 |

IMAGE CAPTURING APPARATUS, ANGLE-OF-VIEW ADJUSTING METHOD AND RECORDING MEDIUM

CROSS-REFERENCE TO RELATED APPLICATION

This application is based upon and claims the benefit of priority from the prior Japanese Patent Application No. 2009-039270, filed Feb. 23, 2009, the entire contents of which is incorporated herein by reference.

BACKGROUND OF THE INVENTION

1. Field of the Invention

The present invention relates to an image capturing apparatus, an angle-of-view adjusting method and a recording medium.

2. Description of the Related Art

A technology is known in which zoom magnification automatically controlled based on changes in the size of a subject. For example, a camera described in Japanese Patent Application Laid-Open (Kokai) Publication No. 2007-208453 applies a technology in which a moving subject is continuously detected and tracked by a template matching method, and zoom magnification is automatically controlled based on the changes in the size of the subject. As a result, a photographer can image a subject at an optimal size without performing a zooming operation.

However, the template matching method described in Japanese Laid-Open Patent Publication No. 2007-208453 has a problem in that the subject cannot be tracked when the size or shape of the subject being tracked changes significantly. In other words, in the template matching method, a current frame image is searched for a small image area similar to a template cut out from a preceding frame image (an image including the subject to be tracked), and an image area having the highest similarity is tracked as the subject. However, in a method such as this, when the size or shape of the subject changes significantly, the degree of similarity with the template cut out from the preceding frame image decreases and the subject cannot be tracked.

Therefore, for example, when a runner (a moving subject) approaches a camera from a distance, cuts across in front of the camera, and moves away from the camera, the template used for matching is required to be quickly and repeatedly updated, causing a problem in which the amount of processing required increases.

SUMMARY OF THE INVENTION

The present invention has been conceived to solve the above-described problems. An object of the present invention is to provide an image capturing apparatus and an angle-of-view adjusting method allowing a subject to be tracked and photographed at an optimal size without placing a burden on processing capacity required for tracking, even when the size of the subject changes significantly.

In order to achieve the above-described object, in accordance with one aspect of the present invention, there is provided an image capturing apparatus comprising an image capturing means; a designating means for designating an image area to be tracked included in an image captured by the image capturing means; a control means for controlling the image capturing means to sequentially capture images; a judging means for judging a trend of changes in the image area designated by the designating means between the images sequentially captured by the control means; and an angle-of-view adjusting means for adjusting an angle-of-view corresponding to the trend of changes judged by the judging means.

In accordance with another aspect of the present invention, there is provided an angle-of-view adjusting method, comprising a designating step of designating an image area to be tracked included in an image captured by an image capturing section; a control step of controlling the image capturing section to sequentially capture images; a judging step of judging a trend of changes in the image area designated in the designating step between the images sequentially captured by the image capturing section; and an angle-of-view adjusting step of adjusting an angle-of-view corresponding to the trend of changes judged in the judging step.

In accordance with another aspect of the present invention, there is provided a computer-readable storage medium having stored thereon a program that is executable by a computer in an image capturing apparatus, the program being executable by the computer to perform a process comprising: designation processing for designating an image area to be tracked included in a captured image; control processing for performing control to sequentially capture images; judgment processing for judging a trend of changes in the image area designated by the designation processing between the images sequentially captured by the control processing; and an angle-of-view adjustment processing for adjusting an angle-of-view including the image area corresponding to the trend of changes judged by the judgment processing.

According to the present invention, a subject is tracked and photographed at an optimal size without placing a burden on processing capacity required for tracking, even when the size of the subject changes significantly.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 9 is a conceptual diagram of a particle P association table;

DETAILED DESCRIPTION OF THE PREFERRED EMBODIMENTS

The present invention will hereinafter be described in detail with reference to the preferred embodiments shown in the accompanying drawings, using a digital camera as an example.

Figure 1A:
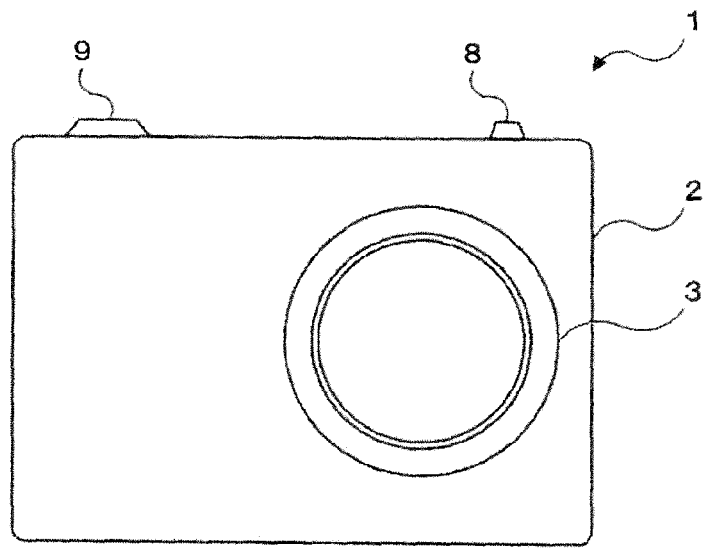
FIG. 1A is a front view of an outer appearance of a digital camera.
Figure 1B:
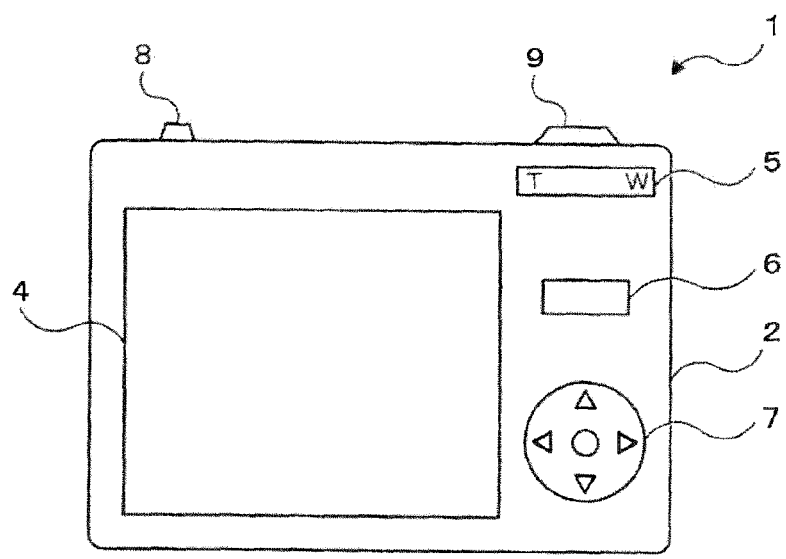
FIG. 1B is a rear view of the outer appearance of the digital camera.

FIG. 1A and FIG. 1B are outer appearance views of a digital camera 1. FIG. 1A is a front view, and FIG. 1B is a rear view.

In FIG. 1A and FIG. 1B, the digital camera 1 is configured such that a lens tube 3 provided with a power zoom function is disposed on the front surface of a body 2 that is suitably shaped such that the digital camera 1 can be hand-held. A display section 4 including a liquid crystal display, a zoom key 5, a function key 6, and a cursor key 7 are disposed on the back surface of this body 2. Also, a power switch 8 and a shutter key 9 provided with a half-shutter function are disposed on the top surface of this body 2. Although this configuration is that of a general-purpose digital camera, the configuration is not limited thereto. For example, the configuration may be that of a digital single-lens reflex camera, a camera mounted on a mobile phone or other electronic devices, or a digital video camera.

Figure 2:
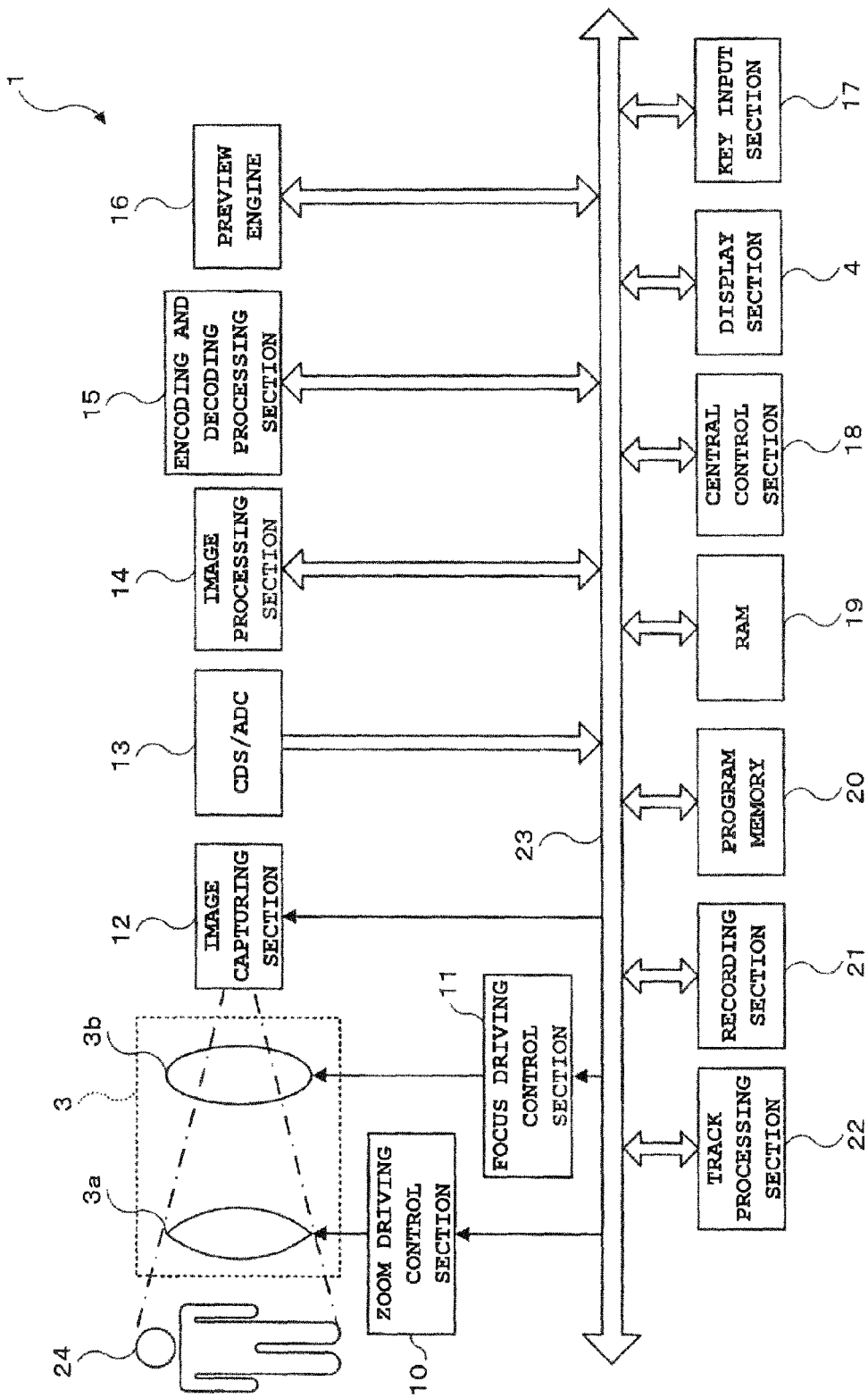
FIG. 2 is a block diagram showing a configuration of the digital camera.

FIG. 2 is a block diagram showing a configuration of the digital camera 1.

In FIG. 2, the digital camera 1 includes the lens tube 3, a zoom driving control section 10, a focus driving control section 11, an image capturing section 12, a correlated double sampling/analog-to-digital conversion section (CDS/ADC) 13, an image processing section 14, an encoding and decoding processing section 15, a preview engine 16, a key input section 17, the display section 4, a central control section 18, a random-access memory (RAM) 19, a program memory 20, a recording section 21, a track processing section 22, and a bus line 23 connecting each section.

Each section will be described in detail. First, the lens tube 3 is a lens unit including a plurality of imaging lenses of which the optical axes are aligned. The imaging lenses shown in FIG. 2 are a zoom lens 3a and a focus lens 3b among the plurality of imaging lenses. The zoom lens 3a can move, with the movement of a zoom motor (not shown) that operates under the control of the zoom driving control section 10, back and forth on the optical axis with respect to the other imaging lenses. As a result of the movement, an angle-of-view (zoom magnification) of the imaging lens for a subject 24 is adjusted. Also, the focus lens 3b can move, with a focus motor (not show) that operates under the control of the focus driving control section 11 (focusing means), back and forth on the optical axis with respect to the other imaging lenses. As a result of the movement, focusing position for the subject 24 is adjusted.

The image capturing section 12 (image capturing means) includes a two-dimensional image sensor such as a charge-coupled device (CCD) or a complementary metal-oxide semiconductor (CMOS), and is disposed on the optical axis of the imaging lenses including the above-described zoom lens 3a and focus lens 3b.

This image capturing section 12 outputs analog image signals based on an optical image of a subject formed through these imaging lenses.

The CDS/ADC 13 is a circuit that converts analog image signals based on an optical image of a subject outputted from the image capturing section 12 into digital signals, and includes, for example, a CDS that holds inputted image signals, a gain adjusting amplifier (automatic gain control [AGC]) that amplifies image signals in association with automatic exposure processing (automatic exposure adjustment) and the like, and an analog-to-digital converter (ADC) that converts amplified image signals into digital image signals.

The image processing section 14 is a circuit that performs various image processing (such as gamma processing) on digital image signals outputted from the CDS/ADC 13.

The encoding and decoding processing section 15 is a circuit that compresses recorded images (image files written in the recording section 21) in a predetermined encoding format such as joint photographic experts group (JPEG), and extends reproduced images (image files read from the recording section 21) using the same format.

The preview engine 16 is a circuit that performs reduction processing on digital image signals outputted from the CDS/ADC 13 and outputs the reduced image signals to the display section 4 as a live-view image (also referred to as a preview image) used for checking composition. In addition, in recording mode, the preview engine 16 performs reduction processing on an image immediately before being recorded in the recording section 21, and outputs the reduced image to the display section 4. Also, in image reproducing mode, the preview engine 16 performs reduction processing on an image read from the recording section 21, and outputs the reduced image to the display section 4.

The key input section 17 is a circuit that generates operating signals for various types of buttons (the zoom key 5, the function key 6, the cursor key 7, the shutter key 9, and the like) arranged on each portion of the body 2.

The display section 4 is includes a liquid crystal display having a predetermined aspect ratio (such as 16:9) and a driver. When display signals and driving control signals for driving the driver are inputted, the display section 4 displays an image based on the display signals in a lower layer as a live-view image and displays messages outputted from the central control section 18, icons, and the like in an upper layer.

The central control section 18 is a single-chip microcomputer performing integrated control of each section of the digital camera 1. This central control section 18 reads out control programs stored in the program memory 15 in advance, and by running the control programs, controls each section of the digital camera 1 and performs, for example, an AE control processing based on luminosity information included in an image signals, an auto-focus (AF) control processing using a contrast detecting method, zoom control, and recording mode processing, described hereafter.

Here, the central control section 18 actualizes functions of a designating means, a control means, a judging means, an angle-of-view adjusting means, and an adjustment amount acquiring means.

The RAM 19 is a buffer memory temporarily storing therein image signals outputted from the CDS/ADC 13. This buffer memory has enough capacity to store a plurality of consecutively-captured images.

The program memory 20 stores and holds in advance the control programs run by the central control section 18. The recording section 21 records and stores image files. This recording section 21 may be detachable, such as a memory card.

The track processing section 22 is a circuit that performs track processing described hereafter. The bus line 23 is a common line used in signal transmission for each section of the digital camera 1.

Here, the track processing section 22 actualizes functions of a storing means, a search point setting means, an updating means, a weight setting means, a sorting means, and a variance acquiring means by operating based on control commands from the central control section 18.

Figure 3A:
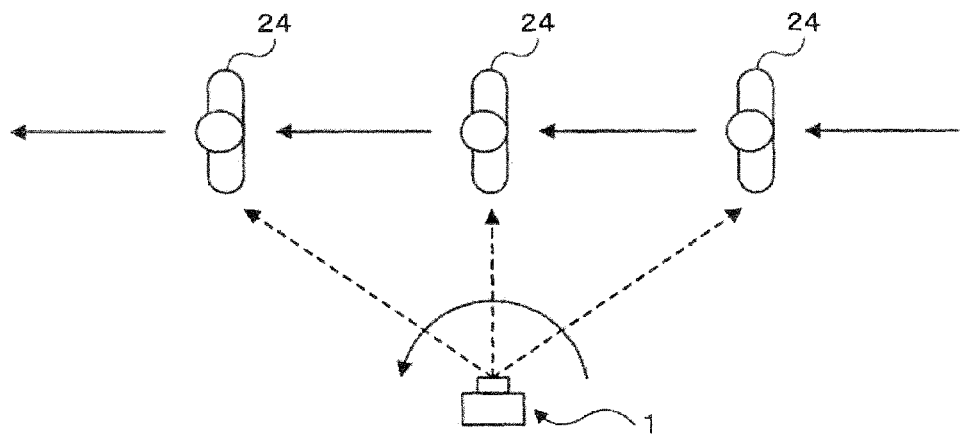
FIG. 3A to FIG. 3C are conceptual diagrams of an example of an imaging scene according to an embodiment.
Figure 3B:
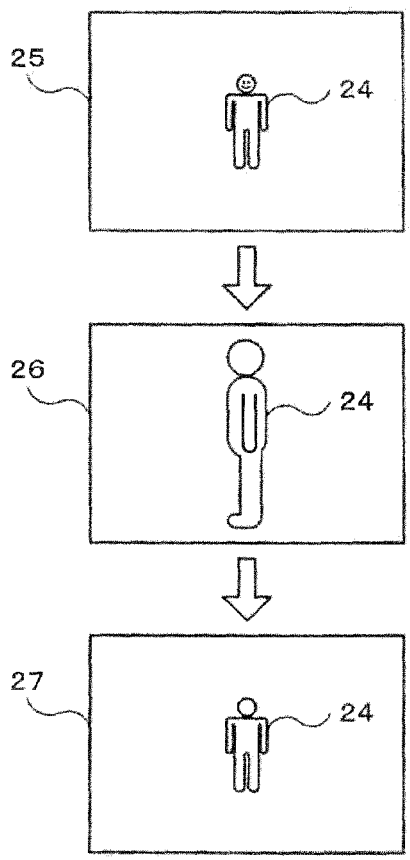
Figure 3C:
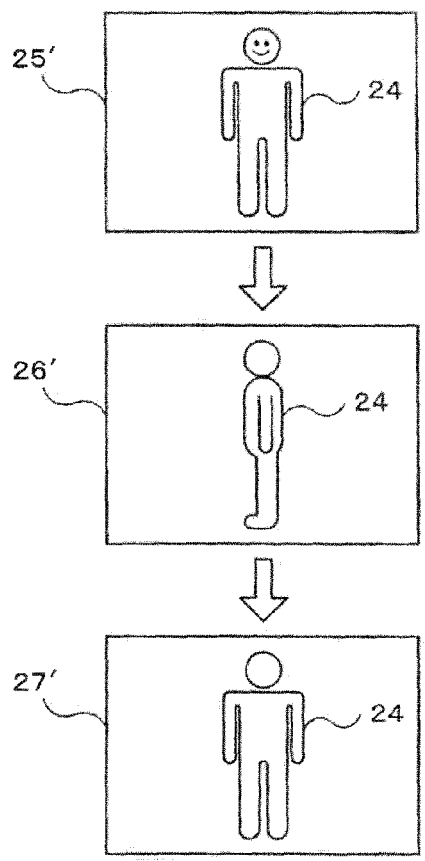

Next, operations of the digital camera 1 will be described.
[Example of an Imaging Scene]
FIG. 3A to FIG. 3C are conceptual diagrams showing an imaging scene according to the present embodiment.

FIG. 3A is a bird's eye view from above of an example of a positional relationship between the subject 24 and the digital camera 1. In this example, the positional relationship in a situation where the subject 24 approaches the digital camera 1 from a distance (right-hand side in relation to the direction facing the diagram), passes in front of the digital camera 1, and moves away from the digital camera 1 is shown in time-series. FIG. 3B shows viewfinder images (the live-view images shown in the display section 4) of the digital camera 1 in this situation. An image 25 is captured when the subject 24 is moving towards the digital camera 1 from a distance, an image 26 is captured at the moment at which the subject 24 passes in front of the digital camera 1, and an image 27 is captured when the subject 24 is moving away with his back to the digital camera 1.

In an imaging scene such as this, as indicated in the image 25, the image 26, and the image 27, the proportion of the subject 24 to the image changes from small to large and becomes small again. Therefore, even when the photographer sets the subject 24 to a desired size by operating the zoom key 3 and fully depresses the shutter key 9 after waiting for a desired composition, it is undeniable that continuous zooming operations are inconvenient.

In order to prevent the above-described problem (inconvenience), in the embodiment, the angle-of-view is set only once in the beginning by the zooming operation, and after the size of the subject 24 in the image is set as intended, the angle-of-view is adjusted automatically.

Specifically, when the photographer zooms in manually such that the subject 24 in the image 25 fits across the composition of the image, the size of the subject 24 in the image 26 and the size of the subject 24 in the image 27 are automatically adjusted to match the size set during the manual zoom-in operation. As a result, the above-described problem (inconvenience) is prevented.

FIG. 3C shows an image 25', an image 26', and an image 27' set as described above. In the image 25', the subject 24 has been zoomed in manually. In the subsequent image 26' and image 27', the size of the subject 24 has been automatically adjusted.

As shown in FIG. 3C, according to the embodiment, the angle-of-view (zoom magnification) is automatically adjusted for the subject 24 that changes in size while moving. Therefore, the size of the subject 24 is kept almost constant. As a result, an effect is achieved in which the shutter can be pressed with the desired angle-of-view at any time, without requiring inconvenient operations. Moreover, as will be described in detail hereafter, because a template matching method such as that in the above-mentioned technology described in Japanese Patent Application Laid-Open (Kokai) Publication No. 2007-208453 is not used, a unique effect is achieved in that the disadvantage (increased processing time) of the technology in Japanese Patent Application Laid-Open (Kokai) Publication No. 2007-208453 is prevented.

Figure 4A:
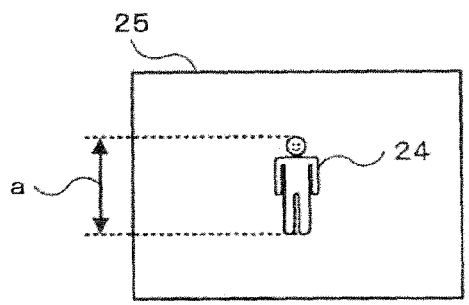
FIG. 4A to FIG. 4F are comparison diagrams of live-view images when automatic zooming is performed and when automatic zooming is not performed.
Figure 4B:
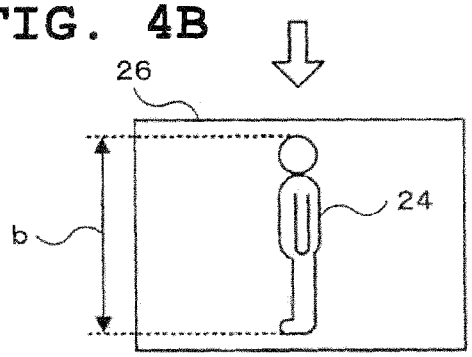
Figure 4C:
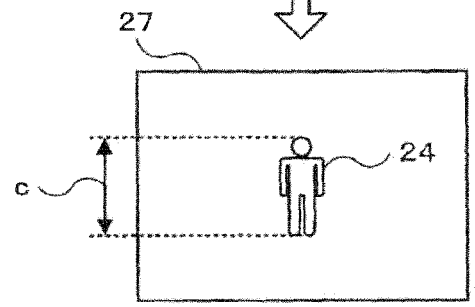

FIG. 4A to FIG. 4F are comparison diagrams of the live-view images when automatic zooming is not performed and when automatic zooming is performed. FIG. 4A to FIG. 4C respectively show the image 25, the image 26, and the image 27 when automatic zooming is not performed.

Figure 4D:
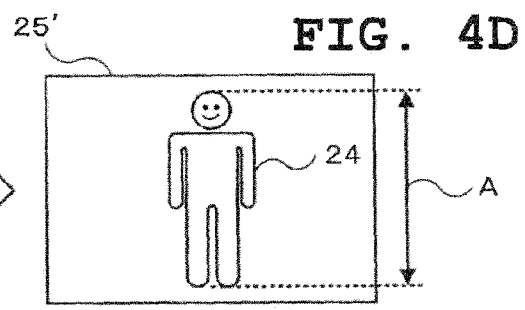
Figure 4E:
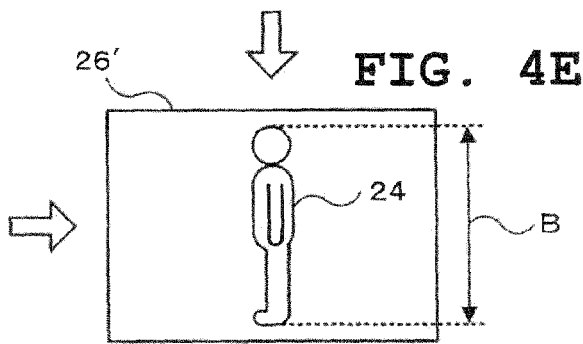
Figure 4F:
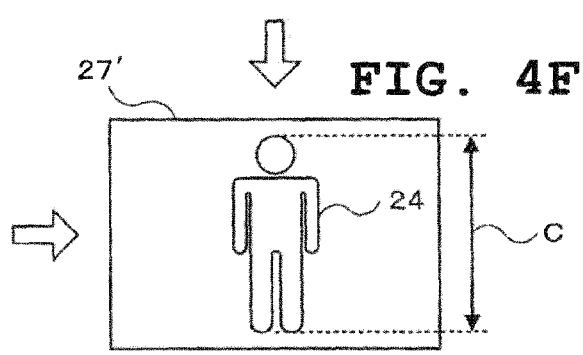

FIG. 4D to FIG. 4F respectively show the image 25', the image 26', and the image 27' when automatic zooming is performed. FIG. 4A (image 25) shows the subject 24 at a distance, FIG. 4B (image 26) shows the subject 24 at the moment at which the subject 24 is passing in front of the digital camera 1, and FIG. 4C (image 27) shows the subject 24 moving away with his back to the digital camera 1. In FIG. 4A to FIG. 4C, the size of the subject 24 in the images when automatic zooming is not performed changes from "small" to "large", and then to "small" again. Here, to simplify the description, the size of the subject 24 in FIG. 4A (image 25) is described as a, the size of the subject 24 in FIG. 4B (image 26) is described as b, and the size of the subject 24 in FIG. 4C (image 27) is described as c. Also, the relationship of those is a<b>c.

The intent of the embodiment is to maintain the size of the subject 24 in the images that changes as shown in FIG. 4A to FIG. 4C (from a to b to c) at a constant size (A=B=C) as shown in FIG. 4D to FIG. 4F (image 25' to image 27').

According to the embodiment, first, the zooming operation is performed manually. In other words, the photographer operates the zoom key 5 at the stage in which the image 25 is captured, and sets the size a of the subject 24 shown in the image 25 to a desired target size (size A of the subject 24 in the image 25' in FIG. 4D).

Subsequently, according to the embodiment, automatic zooming is performed such that the size b of the subject 24 shown in the image 26 becomes the target size (size B of the subject in the image 26'). Furthermore, automatic zooming is performed such that the size c of the subject 24 in the image 27 becomes the target size (size C of the subject 24 in the image 27'). As a result, the size of the subject 24 in the live-view images (image 25' to image 27') during this period can be maintained at a constant size (A=B=C) matching the target size.

Figure 5:
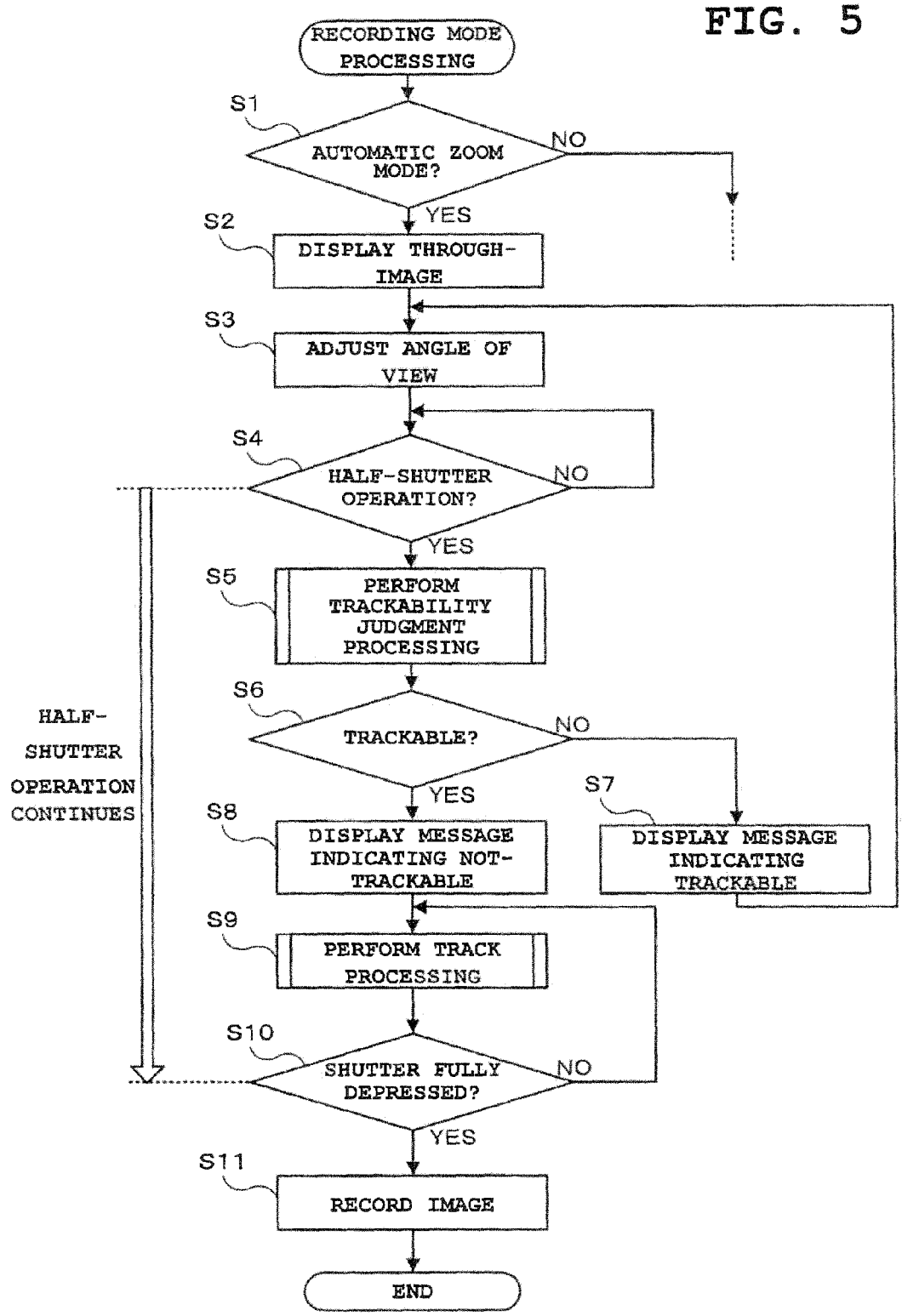
FIG. 5 is a flow diagram of a control program for performing recording mode processing.

Next, the control programs according to the embodiment will be described.
[Recording Mode Processing]
FIG. 5 is a flow diagram of a control program for performing the recording mode processing. In the recording mode processing, a live-view image for checking composition is displayed in the display section 4, and when a half-shutter operation (half-depression operation of the shutter key 9) by the photographer is detected, AE, automatic white balance (AWB), and AF operations are performed. When a full-shutter operation (full-depression operation of the shutter key 9) by the photographer is further detected, an image captured at this point is converted to a JPEG file, and recorded and held in the recording section 21.

This control program is stored in the program memory 20 in advance and is run by the central control section 18 in recording mode.

When the recording mode processing is started, the central control section 18 judges whether or not the digital camera 1 is in automatic zoom mode (Step S1). The automatic zoom mode is a mode used to automatically adjust the angle-of-view (zoom magnification) for the moving subject 24 of which the size changes accordingly, thereby maintaining the size of the subject 24 at an almost constant size. When the judgment result at Step S1 is NO, the central control section 18 judges that another recording mode (such as an ordinary recording mode that does not use automatic zooming) is being used and switches to processing for running this recording mode (not shown). When the judgment result at Step S1 is YES, the central control section 18 performs the following processing.

First, the central control section 18 displays a live-view image in the display section 4 (Step S2), and the user operates the zoom key 5 to adjust the angle-of-view such that the subject 24 is at a desired size within the displayed area (Step S3).

Then, after the angle-of-view is adjusted, the central control section 18 waits for the detection of a half-shutter operation (half-depression operation of the shutter key 9) (Step S4). When the half-shutter operation is detected, the central control section 18 performs AE, AWB, and AF operations. At the same time, the central control section 18 performs "trackability judgment processing" described in detail hereafter (Step S5), and judges whether or not the judgment result is "trackable" (Step S6). In simple terms, the "trackability judgment processing" is processing for designating an image area on which AF has been performed through the half-shutter operation as an image area to be tracked (evaluation subject image, described hereafter) and judging whether or not the movements of the subject included in the designated image area can be tracked.

When judged at Step S6 that tracking cannot be performed, the central control section 18 displays a message indicating that tracking is impossible in the display section 4 (Step S7), and returns to angle-of-view adjustment (Step S3). On the other hand, when judged that tracking can be performed, the central control section 18 displays a message indicating that tracking is possible in the display section (Step S8). Then, while performing the "track processing" (Step S9) described in detail hereafter, the central control section 18 waits for a full-depression operation of the shutter key 9 (Step S10). In simple terms, the "track processing" is a series of processing for, while tracking the movements of the subject 24 on which auto-focus has been performed, continuously performing automatic zooming such that the subject 24 is at a constant size (the above-described target size).

The half-shutter operation by the photographer continues from when the half-shutter operation is detected at Step S4 until the completion of the track processing at Step S9. When the photographer terminates the half-shutter operation during this period, the central control section 18 exits the processing flow at this point and the control program is terminated prematurely.

When the central control section 18 detects the full-depression operation of the shutter key 9 while performing the "track processing", at this point, the central control section 18 converts high-resolution image signals outputted from the image capturing section 12 to a JPEG format image file, and after recording and storing the converted image file in the recording section 21 (Step S11), terminates the program.

[Trackability Judgment Processing]

Figure 6:
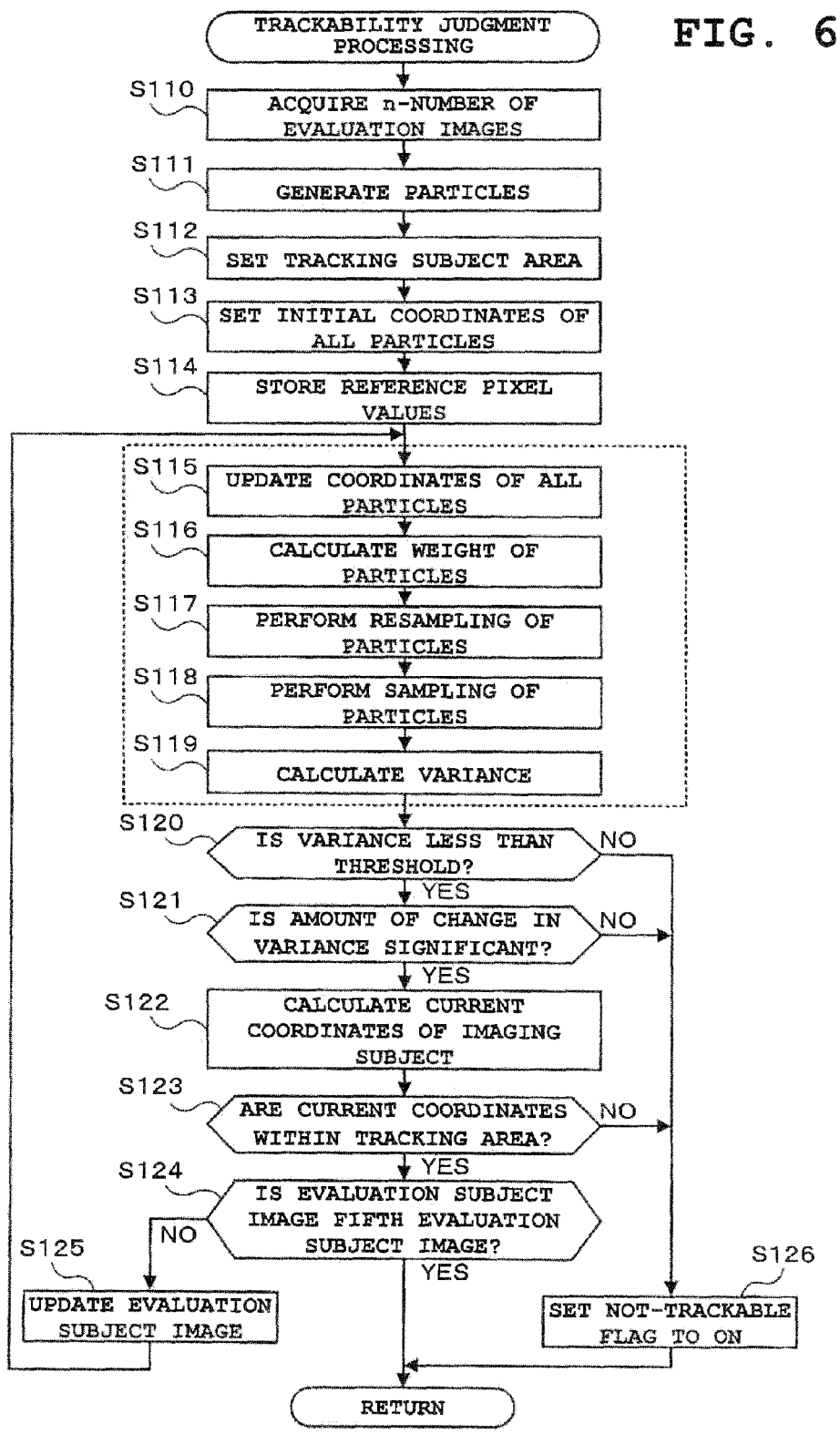
FIG. 6 is a flow diagram showing a control program enabling a central control section 18 to perform trackability judgment processing (see Step S5 in FIG. 5)

FIG. 6 is a flow diagram of a control program enabling the central control section 18 to perform the trackability judgment processing (see Step S5 in FIG. 5).

In this processing flow, the central control section 18 acquires an n-number of image areas (here, n=5) on which the above-described AF operation has been performed from the live-view images as evaluation subject images (Step S110), and successively performs the following learning processes on the five evaluation subject images.

First, the central control section 18 generates a predetermined number of search points (referred to, hereinafter, as particles) P in the evaluation subject image (Step S111). For example, when the number of particles P is 256, the coordinate of each particle P is expressed as P[num] (Px[num],Py[num]) (0<=num<=255).

According to the embodiment, the number of particles P is 256. However, the number of particles P is not limited thereto. A suitable number may be determined as necessary based on the processing capacity of the central processing unit (CPU) of the digital camera 1.

Next, the central control section 18 sets a predetermined area centered on each particle P[num] as a search subject area T[num] (Step S112).

Figure 7A:
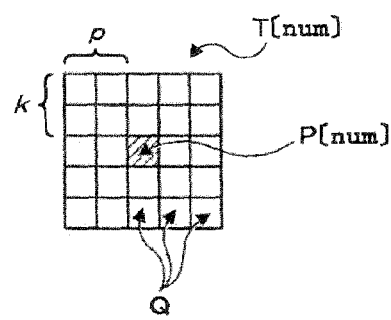
FIG. 7A is a conceptual diagram of a search subject area T[num]

FIG. 7A is a conceptual diagram of the search subject area T[num]. As shown in FIG. 7A, size=2, and the search subject area T is an area that is two pixels in the vertical and horizontal directions from each particle. In other words, the area is 5×5 pixels with a particle at the center. The search subject area T[num] is expressed by a following expression (1):

$$T[num] = \{Q(P_X[num]+p, P_Y[num]+k) | -size \leq p \leq size, -size \leq k \leq size\} \quad (1)$$

Note that, according to the embodiment, size=2. However, the size is not limited thereto. A suitable size value may be determined based on learning accuracy and processing load.

Next, the central control section 18 sets the initial coordinates of all particles P[num] (Step S113).

Figure 7B:
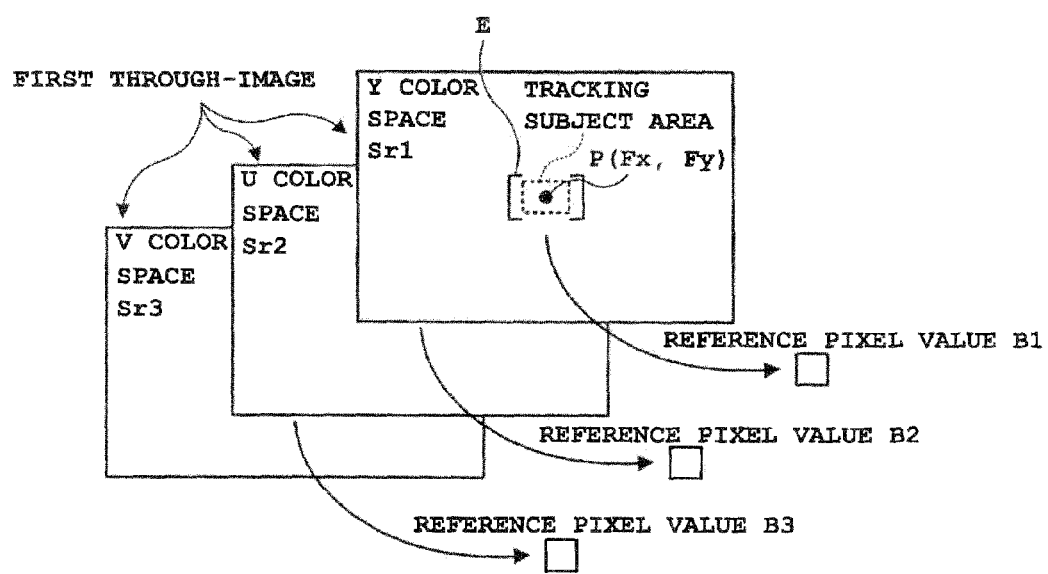
FIG. 7B is a conceptual diagram of initial coordinate setting.

FIG. 7B is a conceptual diagram of initial coordinate setting.

As shown in FIG. 7B, the central control section 18 sets a tracking subject area C within an auto-focus area E. The center point of the tracking subject area C is the initial coordinates (Fx,Fy) of the particle P. In each YUV color space (Y color space: Sr1; U color space: Sr2; and V color space: Sr3) of a first evaluation subject image, the central control section 18 stores reference pixel values B1, B2, and B3 of the respective tracking subject areas (Step S114).

In this way, when the coordinates of the center of the focus area E is (Fx,Fy), the initial coordinates of the particle P[num] is expressed by the following expression (2):

$$P[num](P_X[num], P_Y[num]) = (F_X, F_Y) \quad (2)$$

Note that, according to the embodiment, the YUV color space is used as the color space of the evaluation subject image. However, the color space is not limited thereto. Other color spaces, such as RGB color space, HSV color space, HLS color space, and OHHTA color space may be used. The color space can be selected as necessary based on the color space of the live-view image in the digital camera 1.

When the Y color space of the evaluation subject image is Sr1, the U color space is Sr2, and the V color space is Sr3, respective reference pixel values B1, B2, and B3 are expressed by the following expressions (3) to (5):

$$B1(p,k) = Sr1(F_X+p, F_Y+k) \quad (3)$$

$$B2(p,k) = Sr2(F_X+p, F_Y+k) \quad (4)$$

$$B3(p,k) = Sr3(F_X+p, F_Y+k) \quad (5)$$

$$-size \leq p \leq size, -size \leq k \leq size$$

Next, the five processes surrounded by a dotted line (Step S115 to Step S119 in FIG. 6) are performed. Note that processing similar to these five processes are included in the track processing described hereafter (see FIG. 12).

The five processes are as follows. First, the central control section 18 updates the coordinates of all particles P [num] using a random number in accordance with normal distribution (Step S115).

Figure 8:
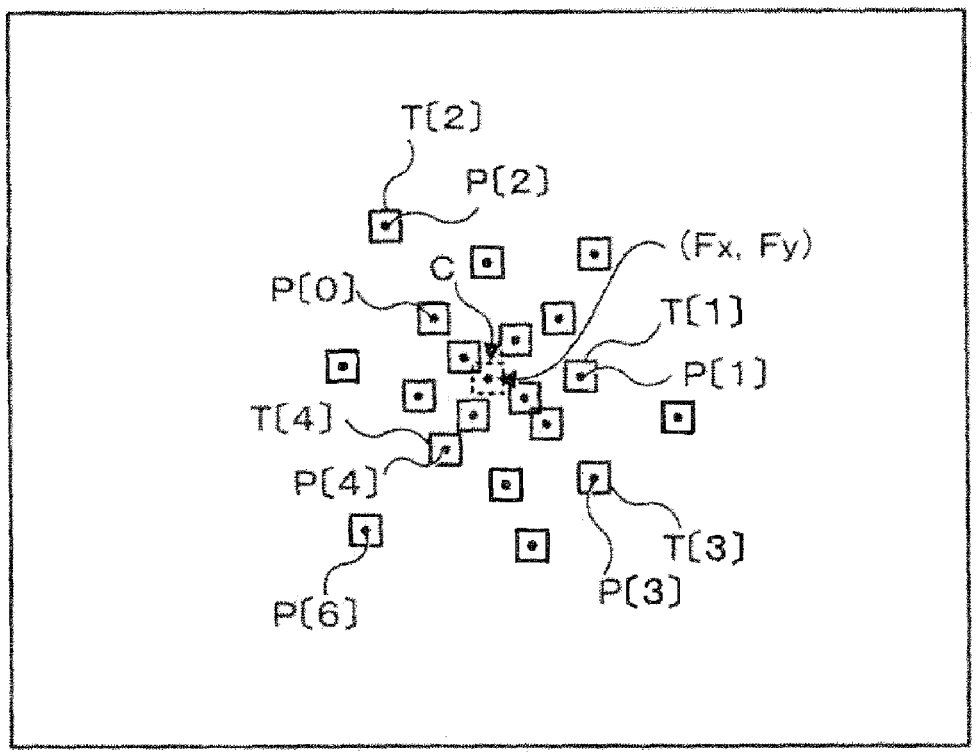
FIG. 8 is a diagram showing distribution of particles P.

FIG. 8 is a diagram of the distribution of the particles P. In FIG. 8, only 20 particles among the 256 particles are shown for simplification. The square-shaped areas in FIG. 8 indicate each search subject area T, and some search subject areas are given reference numbers T[0], T[1] T[2] T[3] T[4], . . . T[6]. Also, a dot in the center of a search subject area is a particle P, and the particles P are, similarly, given reference numbers P[0], P[1], P[2], P[3], P[4], . . . P[6].

Here, when the random number in accordance with a normal distribution with mean μ and variance s2 is assumed N(μ, s2), the coordinates of the particle P[num] is updated as shown in the following expression (6):

$$P[num](P_X[num], P_Y[num]) = (P_X[num] + N[\mu \sigma 2], P_Y[num] + N(\mu, \sigma 2)) \quad (6)$$

In this way, when the coordinates of all particles P[num] are updated, the central control section 18 then calculates the weight of each particle (Step S116). Specifically, in each color space YUV of the evaluation subject image, a pixel value of a pixel Q constituting respective search subject areas T[num] is calculated. Then, the central control section 18 calculates the number of pixels of which the difference between the calculated pixel value and the stored reference pixel values B1 to B3 is within a predetermined range. The number thereof is the weight of the particle.

The "weight" indicates the degree of similarity between the search subject area T[num] of an evaluation subject image and the tracking subject area C of a first evaluation subject image. In other words, a large weight indicates that the search subject area T[num] of an evaluation subject image and the tracking subject area C of a first evaluation subject image are similar.

Specifically, with the lower and upper limit thresholds set to TH1 and TH2, the number of pixels Q satisfying the below expressions (7) to (9) are counted and set as weight Pw[num]. According to the embodiment, the size is 2, and 25 pixels Q constitute each search subject area T[num]. Therefore, the minimum value of the weight Pw[num] is zero and the maximum value is 25.

$$TH1 \leq B1(i, j) - Sr1(P_X[num] + i, P_Y[num] + j) \leq TH2 \quad (7)$$

$$TH1 \leq B2(i, j) - Sr2(P_X[num] + i, P_Y[num] + j) \leq TH2 \quad (8)$$

$$TH1 \leq B3(i, j) - Sr3(P_X[num] + i, P_Y[num] + j) \leq TH2 \quad (9)$$

$$-size \leq i \leq size, -size \leq j \leq size$$

Next, the central control section 18 performs the resampling of the particles P (Step S117). Specifically, with the threshold set to TH3, the central control section 18 performs sampling of the particles P after removing the particles of which the weight Pw is smaller than TH3 (Step S118). In other words, the central control section 18 performs sampling such that a sum of the weight Pw of the particles P remaining after resampling is a predetermined value N. Next, the central control section 18 generates an N-number of identifiers, and associates each of the N-number of identifiers with a particle P based on the weight Pw. In other words, the larger the weight Pw of the particle P is, the larger the number of identifiers associated with this particle P.

Next, the central control section 18 repeats processing to select randomly one identifier from among the N-number of identifiers a number of times equal to the number of particles P. Then, the central control section 18 stores the particles P associated with the identifiers selected in this processing as 256 new particles P[num]. Here, there is a case where a certain particle P is selected numerous times. In this case, the certain particle P is stored numerous times.

FIG. 9 is a conceptual diagram of a particle P association table. In FIG. 9, the central control section 18 generates integers from 0 to 1023 as the identifiers, with the TH3 used at Step S117 set to 4, and N that is the sum of the weights Pw set to 1024. Then, the central control section 18 assigns each of the 1024 integers to a particle P based on weight Pw.

For example, because the weight Pw of the particle P[23] is 22, the particle P[23] is associated with integers 0 to 21. Also, because the weight Pw of the particle P[248] is 22, the particle P[248] is associated with integers 22 to 43.

Next, the central control section 18 generates a random number within the range of 0 to 1023, 256 times. The central control section 18 then extracts numerical values equivalent to the generated random numbers from the 1024 integers, and stores the particles P associated with the extracted numerical values as new particles P[num].

In other words, as a result of the processing at Step S117 (particle resampling) and Step S118 (particle sampling) described above, certain P[num] are selected from the P[num]. Then, the selected P[num] are given a number from 0 to 255 and stored as new P[num].

Figure 10:
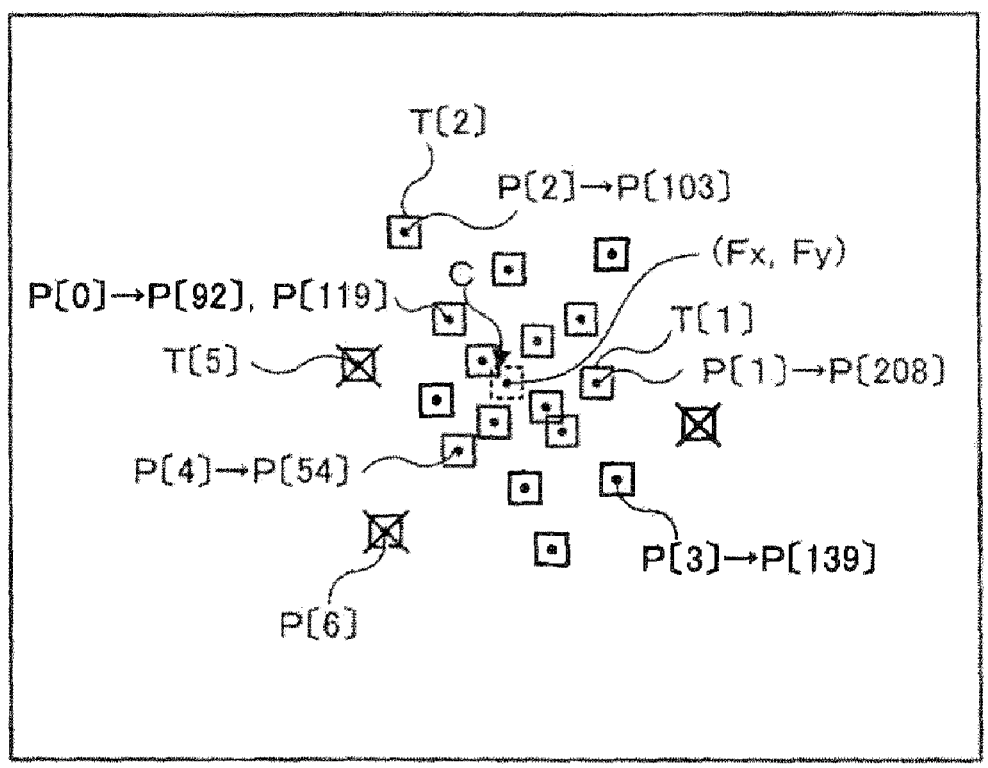
FIG. 10 is a distribution diagram of new P[num]

FIG. 10 is a distribution diagram of the new P[num]. Distribution of the P[num] enters the state shown in FIG. 10 from the state shown in FIG. 8. For example, P[5] and P[6] are deleted because their weights Pw are smaller than TH3 or because they were not selected by the random numbers. On the other hand, P[0] has been selected numerous times during the random selection of an identifier from among the N-number of identifiers, and therefore is stored as new P[92] and P[119]. P[1] is stored as a new P[208], and P[2] is stored as a new P[103]. P[3] is stored as a new P[139], and P[4] is stored as a new P[54].

When distribution of the new P[num] is obtained in this way, the central control section 18 then calculates variance V of the coordinates of the new particles P[num] (Step S119). The description up to this point is an explanation of the operations of the five processes (Step S115 to Step S119) surrounded by the dotted line.

The "variance V" is a value expressing the variance of spatial distribution (not necessarily normal distribution) of the particles, and the value of "variance V" is obtained by the below expression (10). In the expression (10), $x_i$ and $y_i$ are the coordinates of the particle, and x and y with an overbar respectively express the mean value of x and y. The "variance V" differs from the "variance s2" in the previous expression (6). The "variance s2" in the previous expression (6) indicates the variance of normal distribution when the coordinates of the particles are moved by random numbers in accordance with normal distribution, upon the coordinates of the particles being updated at Step S115. On the other hand, the "variance V" indicates the variance of spatial distribution of a plurality of particles tracking the subject.

$$V = \frac{1}{2} \sum_{i=1}^{n} ((x_i - \bar{x})^2 + (y_i - \bar{y})^2) \quad (10)$$

Next, the central control section 18 judges whether or not the variance V is smaller than a predetermined threshold (Step S120). When the judgment result at Step S120 is NO, the subject cannot be tracked. Therefore, the central control section 18 proceeds to Step S126, and after setting a not-trackable flag to ON, returns to Step S6 in FIG. 5. On the other hand, when the judgment result at Step S120 is YES, the central control section 18 judges whether or not the amount of change in the variance V from the previous variance V is significant (Step S121).

When the judgment result at Step S121 is NO, the central control section 18 sets the not-trackable flag to ON and returns to Step S6 in FIG. 5. On the other hand, when the judgment result at Step S121 is YES, the central control section 18 calculates the weighted mean of the coordinates of all particles P[num] as the current coordinates of the subject (Step S122) and judges whether or not the coordinates are positioned within the tracking area of the evaluation subject image (Step S123).

When the judgment result at Step S123 is NO, the central control section 18 sets the not-trackable flag to ON and returns to Step S6 in FIG. 5. On the other hand, when the judgment result at Step S123 is YES, the central control section 18 judges whether or not the current evaluation subject image is the last (fifth) image (Step S124). When the judgment result at Step S124 is NO, the central control section 18 updates the evaluation subject image to the next image (Step S125), and after returning to Step S115, performs loop processing. When the judgment result at Step S124 is YES, the central control section 18 proceeds to Step S6 in FIG. 5.

[Track Processing]

Figure 11:
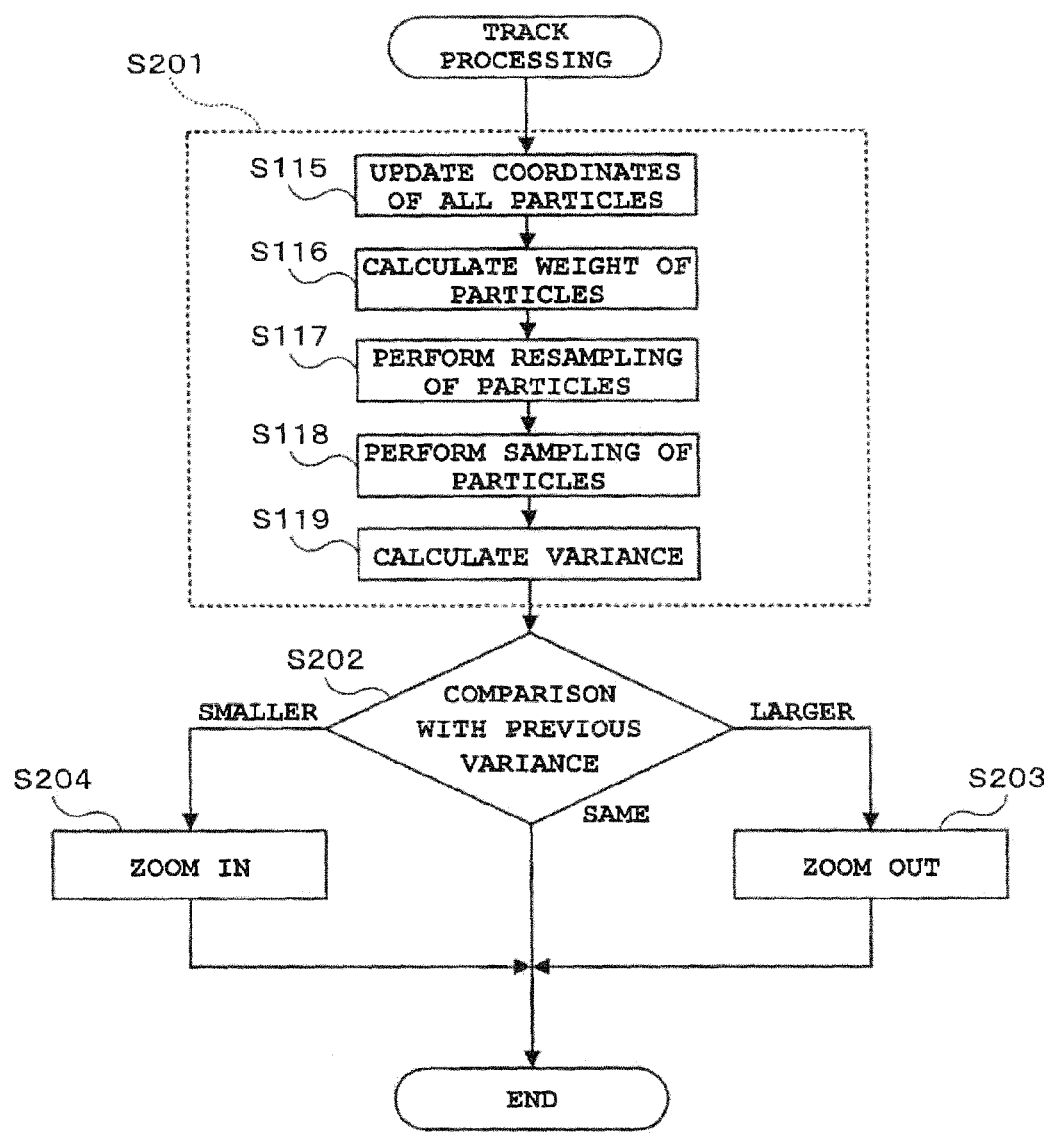
FIG. 11 is a flow diagram showing a control program enabling the central control section 18 to perform track processing (see Step S9 in FIG. 5)

FIG. 11 is a flow diagram of a control program that runs when the central control section 18 controls the track processing section 22 to perform the track processing (see Step S9 in FIG. 5).

In the embodiment, the "track processing" refers to a series of processing that judges a trend of changes in a tracking subject while tracking the subject on which auto focus has been performed, and continuously performs automatic zooming such that the subject in the live-view images are at a constant size (the above-described target size).

In the embodiment, processing identical to the processing performed at Step S115 to Step S119 in FIG. 6 are performed in this "track processing". Then, the angle-of-view is adjusted while tracking the subject by focusing on a fixed correlation established between the trend of the changes in the variance V obtained through the above processing and the trend of the changes in the tracking subject.

In the track processing, first, the processes identical to the processes performed at Step S115 to Step S119 in FIG. 6 are performed (Step S201), and then a current variance V(N) and a previous variance V(N−1) are compared (Step S202). The result of the comparison at Step S202 is any of "V(N)<V(N−1)", "V(N)=V(N−1)", and "V(N)>V(N−1)".

When the variance V(N) is larger than the previous variance V(N−1) [V(N)>V(N−1)], the size of the subject in the image is considered to have increased, such as when a person is approaching the digital camera 1. In this case, zoom-out processing is performed to maintain the size of the subject in the image at a constant size. On the other hand, when the variance V(N) is smaller than the previous variance V(N−1) [V(N)<V(N−1)], the size of the subject in the image is considered to have decreased, such as when a person is moving away from the digital camera 1. In this case, zoom-in processing is performed to maintain the size of the subject in the image at a constant size.

Specifically, when the comparison result at Step S202 is "smaller" [when the variance V(N) is smaller than the previous variance V(N−1): V(N)<V(N−1)], the zoom lens 3*a* is controlled to be driven in a T (telescopic) direction (zoom-in control) and the angle-of-view is narrowed. When the comparison result is "larger" [when the variance V(N) is larger than the previous variance V(N−1): V(N)>V(N−1)], the zoom lens 3*a* is controlled to be driven in a W (wide-angle) direction (zoom-out control) and the angle-of-view is widened. When the comparison result is "same", the zoom lens 3*a* is not controlled and driven.

Figure 12:
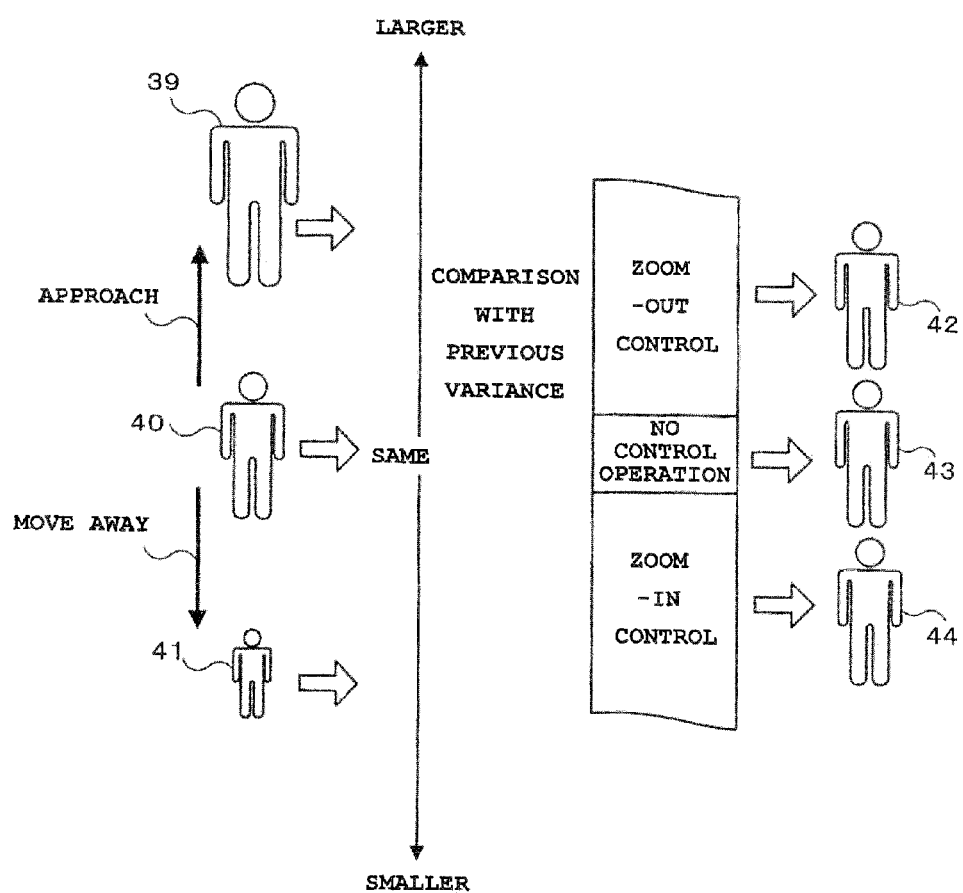
FIG. 12 is a conceptual diagram showing the track processing according to the present invention.

FIG. 12 is a conceptual diagram of the track processing according to the present embodiment.

The variance V obtained by the five processes (Step S115 to Step S119) of the track processing indicates a change in the size of the tracking subject in the image. For example, among the three subject 39, subject 40, and subject 41 in FIG. 12, the size of the middle subject 40 in the image considers the target size (the size serving as the target for the angle-of-view adjustment performed at Step S3 in FIG. 5), if the variance of the subject 40 is the previous variance V(N−1), and the size of the subject changes from that of the subject 40 to that of the subject 39, the variance V(N) of the subject 39 is larger than the variance V(N−1) of the subject 40. Also, if the size of the subject changes from that of the subject 40 to that of the subject 41, then this is a case where the subject has moved away from the digital camera 1, and the variance V of the subject 41 is smaller than the variance V(N−1) of the subject 40.

Accordingly, the trend of the changes in the tracking subject can be judged by finding the changes in the variance V, and zoom-in and zoom-out control can be performed in accordance with the detected results.

As just described, according to the present embodiment, the variance V of the coordinates of the particle P[num] is calculated, and the changes in the size of the tracking subject are determined based on the changes in the variance V. Therefore, the subject is not required to be detected by a template matching method or the like. Accordingly, an extraordinary effect is achieved in which the size of the tracking subject is maintained at a constant size without an increase of processing load, even when the size of the subject changes significantly.

While the present invention has been described with reference to the preferred embodiments, it is intended that the invention be not limited by any of the details of the description therein but includes all the embodiments which fall within the scope of the appended claims.

What is claimed is:

1. An image capturing apparatus comprising:
   an image capturing section;
   a designating section which designates an image area to be tracked that is included in an image captured by the image capturing section;
   an imaging control section which controls the image capturing section to sequentially capture images;
   a storing section which stores feature quantities of the image area designated by the designating section;
   a search point setting section which sets a plurality of search points in the image area;
   an updating section which updates coordinates of the search points set by the search point setting section using random numbers;
   a weight setting section which compares the feature quantities stored by the storing section with feature quantities of the search points updated by the updating section, and sets a weight to each search point based on similarity;
   a sorting section which sorts the search points that have been set a weight by the weight setting section according to the weight;
   a variance acquiring section which acquires a variance of the search points sorted by the sorting section;
   a judging section which judges a trend of changes between the images sequentially captured by the imaging control section based on changes of the variance acquired by the variance acquiring section; and an angle-of-view adjusting section which adjusts a photographing angle-of-view that includes the image area corresponding to the trend of changes judged by the judging section.

2. The image capturing apparatus according to claim 1, further comprising:

an adjustment amount acquiring section which acquires an amount of adjustment to be made by the angle-of-view adjusting section corresponding to the variance acquired by the variance acquiring section.

3. The image capturing apparatus according to claim 1, wherein the angle-of-view adjusting section performs adjustment such that the photographing angle-of-view is narrowed when the judging section judges that the variance is smaller, and the photographing angle-of-view is widened when the judging section judges that the variance is larger.

4. The image capturing apparatus according to claim 1, wherein the angle-of-view adjusting section adjusts the angle-of-view such that the image area is almost a constant size between the images sequentially captured by the image control section.

5. The image capturing apparatus according to claim 1, further comprising:

a zoom lens;

wherein the angle-of-view adjusting section adjusts the angle-of-view by driving the zoom lens.

6. The image capturing apparatus according to claim 1, further comprising:

a focusing section which focuses on the subject by driving a focus lens;

wherein the image area designated by the designating section is an area in the image focused by the focusing section.

7. An angle-of-view adjusting method, comprising:

designating an image area to be tracked that is included in an image captured by an image capturing section;

controlling the image capturing section to sequentially capture images;

storing feature quantities of the designated image area;

setting a plurality of search points in the image area;

updating coordinates of the set search points using random numbers;

comparing the stored feature quantities and feature quantities of the updated search points, and setting a weight to each search point based on similarity;

sorting the search points that have been set a weight according to the weight;

acquiring a variance of the sorted search points;

judging a trend of changes between the images sequentially captured by the image capturing section based on changes of the acquired variance; and adjusting a photographing angle-of-view that includes the image area corresponding to the judged trend of changes.

8. A non-transitory computer-readable storage medium having stored thereon a program that is executable by a computer in an image capturing apparatus, the program being executable by the computer to perform functions of elements including:

a designating section which designates an image area to be tracked that is included in a captured image;

an imaging control section which performs control to sequentially capture images;

a storing section which stores feature quantities of the image area designated by the designating section;

a search point setting section which sets a plurality of search points in the image area;

an updating section which updates coordinates of the search points set by the search point setting section using random numbers;

a weight setting section which compares the feature quantities stored by the storing section with feature quantities of the search points updated by the updating section, and sets a weight for each search point based on similarity;

a sorting section which sorts the search points that have been set a weight by the weight setting section according to the weight;

a variance acquiring section which acquires a variance of the search points sorted by the sorting section;

a judging section which judges a trend of changes between the sequentially captured images based on changes of the variance acquired by the variance acquiring section; and an angle-of-view adjusting section which adjusts a photographing angle-of-view that includes the image area corresponding to the trend of changes judged by the judging section.

* * * * *